(12) United States Patent
Kamath et al.

(10) Patent No.: US 11,843,689 B2
(45) Date of Patent: Dec. 12, 2023

(54) METHODS AND SYSTEMS FOR REDUCING PROPAGATION DELAYS IN HARDWARE IMPLEMENTATION OF ZUC CRYPTOGRAPHIC ALGORITHMS

(71) Applicant: Samsung Electronics Co., Ltd., Suwon-si (KR)

(72) Inventors: Akshay Karkal Kamath, Bengaluru (IN); Sachin Kashyap, Bengaluru (IN); Subramanian Parameswaran, Bengaluru (IN); Sunil Aggarwal, Bengaluru (IN); Tarun Rajendra Mittal, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/836,442

(22) Filed: Jun. 9, 2022

(65) Prior Publication Data

US 2023/0047879 A1    Feb. 16, 2023

(30) Foreign Application Priority Data

Aug. 6, 2021  (IN) .............................. 202141035512

(51) Int. Cl.
| | | |
|---|---|---|
| H04L 29/06 | (2006.01) | |
| H04L 9/06 | (2006.01) | |
| H04L 9/32 | (2006.01) | |
| H04L 9/34 | (2006.01) | |

(52) U.S. Cl.
CPC .......... *H04L 9/0631* (2013.01); *H04L 9/3242* (2013.01); *H04L 9/34* (2013.01); *H04L 2209/122* (2013.01); *H04L 2209/24* (2013.01)

(58) Field of Classification Search
CPC ....... H04L 9/0631; H04L 9/3242; H04L 9/34; H04L 2209/122; H04L 2209/24; H04L 2209/80; H04L 9/0662
See application file for complete search history.

(56) References Cited

U.S. PATENT DOCUMENTS

| | | | | |
|---|---|---|---|---|
| 9,025,766 | B2* | 5/2015 | Jankowski | ............... G09C 1/00 380/29 |
| 9,319,878 | B2* | 4/2016 | Wei | ...................... H04W 12/04 |
| 9,379,887 | B2 | 6/2016 | Wei et al. | |
| 9,490,971 | B2 | 11/2016 | Wolrich et al. | |

(Continued)

FOREIGN PATENT DOCUMENTS

| | | |
|---|---|---|
| CN | 103813313 B | 6/2017 |
| CN | 110011798 A | 7/2019 |
| CN | 110034919 A | 7/2019 |

*Primary Examiner* — John B King
(74) *Attorney, Agent, or Firm* — Harness, Dickey & Pierce, P.L.C.

(57) ABSTRACT

Embodiments of present disclosure relates to and systems to reduce propagation delays in hardware implementation of 3GPP confidentiality or standardized algorithm 128-EEA3 and 3GPP integrity algorithm 128-EIA using ZUC module. The reduction of the propagation delays is achieved by improving or optimizing secondary critical paths, which are subsequent to primary critical path, related to the 3GPP confidentiality or standardized algorithm 128-EEA3 and the 3GPP integrity algorithm 128-EIA3. Non-conventional modifications in the hardware implementation are proposed for the improvement or optimization.

18 Claims, 8 Drawing Sheets

(56) References Cited

U.S. PATENT DOCUMENTS

| | | | |
|---|---|---|---|
| 9,910,792 B2 | 3/2018 | Satpathy et al. | |
| 2013/0301611 A1* | 11/2013 | Baghel | H04L 63/123 370/329 |
| 2014/0079215 A1* | 3/2014 | Wei | H04L 9/0662 380/46 |
| 2014/0079220 A1* | 3/2014 | Wei | H04W 12/033 380/270 |
| 2014/0189290 A1* | 7/2014 | Wolrich | G06F 9/3867 712/7 |
| 2014/0237237 A1* | 8/2014 | Brumley | H04W 12/106 713/168 |
| 2014/0258721 A1* | 9/2014 | Avanzi | H04L 9/0668 713/168 |
| 2014/0270152 A1* | 9/2014 | Jankowski | H04L 9/0662 380/28 |
| 2016/0165491 A1* | 6/2016 | Liu | H04W 12/04 370/331 |
| 2018/0034635 A1* | 2/2018 | Zhang | H04W 12/03 |
| 2018/0083972 A1* | 3/2018 | Kim | H04L 41/0853 |
| 2019/0296894 A1* | 9/2019 | Nuñez | H04L 9/0631 |
| 2019/0349340 A1 | 11/2019 | Zhang et al. | |
| 2020/0221281 A1* | 7/2020 | Rajadurai | H04L 9/3242 |
| 2020/0322160 A1* | 10/2020 | Torvinen | H04W 12/106 |
| 2023/0083122 A1* | 3/2023 | Chen | H04W 12/06 |

\* cited by examiner

| Bit | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | 0 | 0 | 1 | 1 | 0 | 0 | 0 | 1 | 0 | 1 | 0 | 0 | 1 | 1 | 1 | 1 |
| 1 | 1 | 1 | 1 | 0 | 1 | 1 | 0 | 1 | 0 | 1 | 0 | 1 | 0 | 1 | 1 | 0 |
| 2 | 1 | 0 | 0 | 1 | 0 | 0 | 1 | 0 | 1 | 0 | 1 | 0 | 1 | 1 | 0 | 0 |
| 3 | 1 | 1 | 0 | 0 | 1 | 1 | 1 | 0 | 1 | 1 | 1 | 1 | 1 | 0 | 0 | 0 |
| 4 | 0 | 1 | 0 | 1 | 1 | 1 | 1 | 1 | 1 | 0 | 1 | 0 | 1 | 0 | 1 | 1 |
| 5 | 1 | 1 | 0 | 1 | 1 | 1 | 0 | 0 | 1 | 0 | 1 | 1 | 1 | 0 | 0 | 0 |
| 6 | 0 | 0 | 1 | 1 | 0 | 0 | 0 | 1 | 0 | 1 | 0 | 0 | 0 | 1 | 1 | 1 |
| 7 | 1 | 1 | 0 | 0 | 1 | 1 | 0 | 0 | 1 | 1 | 1 | 0 | 0 | 1 | 1 | 0 |
| 8 | 1 | 0 | 1 | 1 | 0 | 0 | 1 | 0 | 0 | 0 | 0 | 1 | 1 | 1 | 0 | 0 |
| 9 | 1 | 1 | 0 | 0 | 1 | 1 | 1 | 0 | 1 | 1 | 1 | 1 | 0 | 0 | 0 | 0 |
| A | 0 | 0 | 1 | 0 | 0 | 0 | 1 | 1 | 0 | 0 | 0 | 0 | 1 | 1 | 1 | 1 |
| B | 0 | 0 | 1 | 0 | 0 | 0 | 0 | 1 | 0 | 1 | 0 | 1 | 0 | 0 | 0 | 1 |
| C | 0 | 0 | 1 | 0 | 0 | 0 | 1 | 1 | 0 | 0 | 0 | 0 | 0 | 1 | 1 | 1 |
| D | 0 | 0 | 0 | 0 | 0 | 0 | 0 | 0 | 1 | 1 | 1 | 0 | 0 | 0 | 0 | 1 |
| E | 0 | 1 | 1 | 1 | 1 | 1 | 1 | 0 | 0 | 0 | 0 | 1 | 1 | 0 | 1 | 1 |
| F | 1 | 1 | 0 | 1 | 1 | 1 | 0 | 0 | 1 | 0 | 1 | 1 | 0 | 0 | 0 | 0 |

METHODS AND SYSTEMS FOR REDUCING PROPAGATION DELAYS IN HARDWARE IMPLEMENTATION OF ZUC CRYPTOGRAPHIC ALGORITHMS

CROSS-REFERENCE TO RELATED APPLICATIONS

This application claims priority under 35 USC § 119 to Indian Patent Application No. 202141035512, filed on Aug. 6, 2021 in the Indian Patent Office, the contents of which are herein incorporated by reference in their entirety.

TECHNICAL FIELD

The present subject matter is related in general to hardware implementation of ZUC cryptographic algorithms in 5G modems, more particularly, but not exclusively to methods and systems for reducing propagation delays in hardware implementation of ZUC cryptographic algorithms.

BACKGROUND

Figure 1:
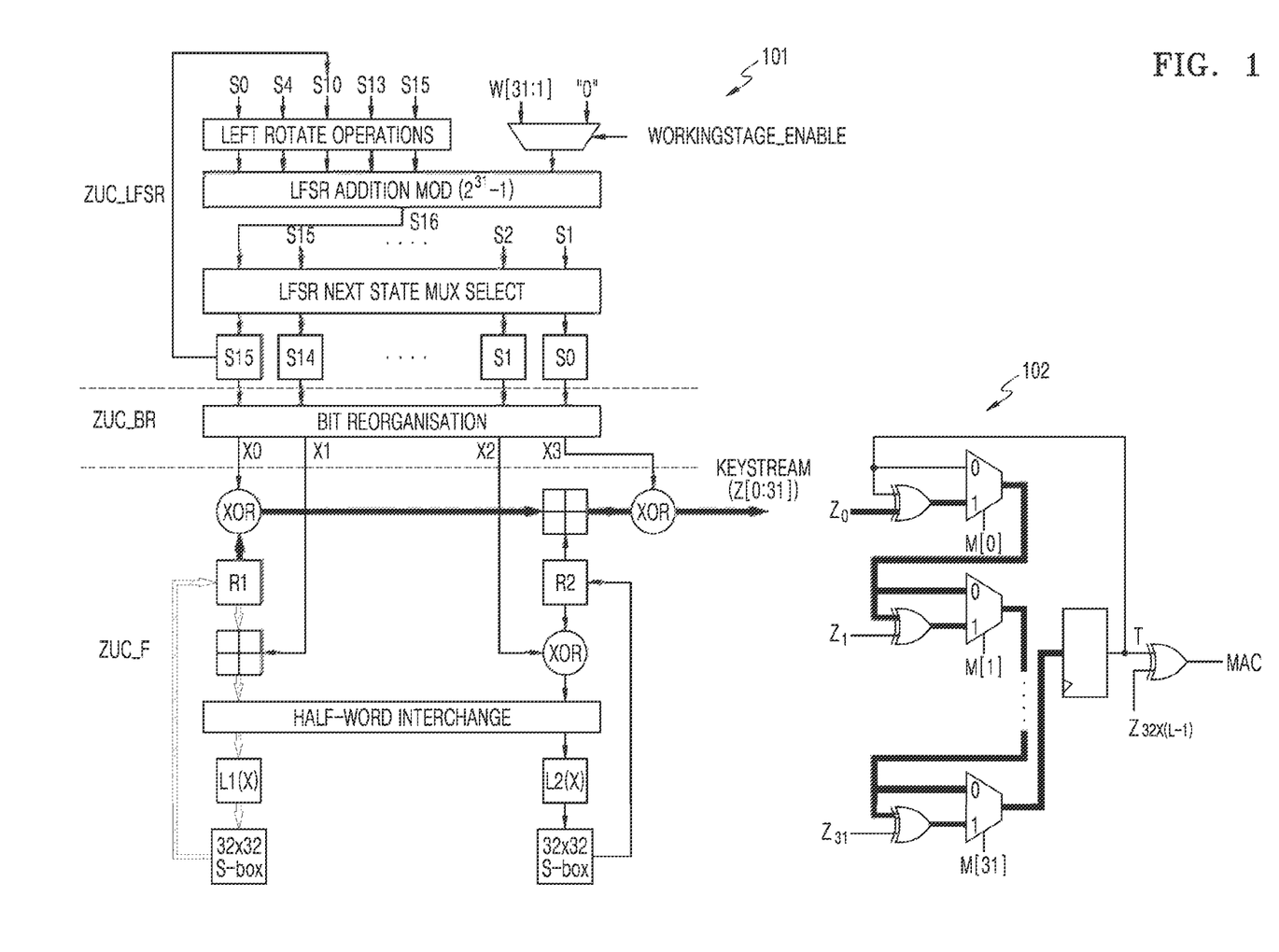
FIG. 1 shows conventional implementation of 3GPP confidentiality or standardized algorithm 128-EEA3 and 3GPP integrity algorithm 128-EIA3 using ZUC module, in accordance with some exemplary embodiments of the present disclosure.

A ZUC module is a stream cipher that forms the heart of 3GPP confidentiality or standardized algorithm 128-EEA3 and 3GPP integrity algorithm 128-EIA3. Conventional implementation of the ZUC module for the 3GPP confidentiality algorithm 128-EEA3 and the 3GPP integrity algorithm 128-EIA3 is shown in FIG. 1. ZUC module 101 takes a 128-bit initial key and a 128-bit Initial Vector (IV) as input, and outputs a keystream of 32-bit words for each clock cycle. Each 32-bit word may be referred to as keyword or key. The keystream may be used for encryption and decryption of blocks of data using equations 1 and 2, given below, respectively.

$$\text{Ciphertext} = \text{Plaintext}\char`\^\text{Keyword} \quad (1)$$

$$\text{Plaintext} = \text{Ciphertext}\char`\^\text{Keyword} \quad (2)$$

Further, the keystream may be used for the 3GPP integrity algorithm 128-EIA3 for computing Message Authentication Code (MAC) using a hashing module 102 along with ZUC module 101, as shown in FIG. 1. During the computation of MAC, the ZUC module 101 along with the hashing module 102 computes a MAC of a given message using an integrity key. For computing the 32-bit MAC, let ZUC generate a keystream of length L.

$$L = \text{ceiling}\left(\frac{\text{LENGTH}}{32} + 2 \text{ words}\right)$$

Bit string generated by the ZUC module may be Z [0], Z [1] . . . . Z[32×L−1].
Let T be a 32-bit word. Set T=0.
For each i=0, 1, 2 . . . 32×(L−1), let $Z_i = Z[i] \| Z[i+1] \| \ldots \| Z[i+31]$.
where ∥ indicates concatenation.
Then each $Z_i$ is a 32-bit word.
For each i=0, 1, 2 . . . LENGTH,
If M[i]=1, then T=T⊕Zi
Set MAC=T⊕$Z_{32 \times (L-1)}$ The execution of ZUC has two stages namely an initialization stage and a working stage. In the initialization stage, a key/IV initialization is performed, e.g., the cipher is clocked without producing output. In the working stage, with every clock pulse, the ZUC module produces a 32-bit word of output indicated as Z [0:31] in FIG. 1.

The ZUC module 101 of FIG. 1 includes three logical layers. Top layer is a Linear Feedback Shift Register (LFSR) of 16 stages referred to as ZUC_LFSR, middle layer is for Bit-Reorganization (BR) referred to as ZUC_BR, and bottom layer is a nonlinear function F referred to as ZUC_F. Implementation of ZUC module 101 at hardware level involves mapping of ZUC cryptographic algorithms with pseudo code using logic gates into a gate-level circuit.

Propagation delay in critical paths of the ZUC module 101 may be advantageously improved or optimized to increase frequency of operation. Lesser the propagation delay, greater the frequency of operation. Further, by improving or optimizing the critical paths, timing, performance and the key generation at every clock cycle may also be improved in the hardware implementation of the ZUC module.

One or more conventional systems disclose improvement or optimization of only primary critical path R1-S15 of the ZUC module 101. One such conventional system teaches to break the primary critical path R1-S15 using pipelined implementation to achieve the improvement or optimization. However, subsequent to improving or optimizing the primary critical path, secondary critical paths also aid in limiting throughput in the hardware implementation. A secondary critical path in the 3GPP confidentiality or standardized algorithm 128-EEA3 is R1 to R1 path as shown in FIG. 1. Similarly, a secondary critical path in the 3GPP integrity algorithm 128-EIA3 is R1 to T path as shown in FIG. 1. No conventional system or method teaches improving or optimizing such secondary critical path to achieve higher throughput and enhance performance during hardware implementation of the 3GPP confidentiality or standardized algorithm 128-EEA3 and the 3GPP integrity algorithm 128-EIA3 using the ZUC module.

The information disclosed in this background of the disclosure section is only for enhancement of understanding of the general background of the inventive concepts and should not be taken as an acknowledgement or any form of suggestion that this information forms the prior art already known to a person skilled in the art.

SUMMARY

In exemplary embodiments, the present disclosure relates to a method to reduce propagation delay in a hardware implementation of a 3GPP Integrity algorithm 128-EIA3 performed using a ZUC module. The method includes receiving plurality of sliding key strings derived from keys generated in subsequent clock cycles by the ZUC module, performing a logical conjunction operation of each bit of the sliding key string with bits of a message string to be hashed, using a conjunction operator, to output a plurality of multi-bit strings and performing a bit-wise logical exclusive disjunction operation on each of the plurality of multi-bit strings using an exclusive disjunction operator, to output plurality of single bits, for reducing delay when computing a MAC using the ZUC module. The plurality of single bits together constitute a T-string used for computing the MAC.

In exemplary embodiments, the present disclosure relates to a first delay reduction system for reducing propagation delay in a hardware implementation of a 3GPP Integrity algorithm 128-EIA3 performed using a ZUC module. The first delay reduction system comprises a plurality of conjunction operators configured to receive a plurality of sliding key strings derived from keys generated in subsequent clock cycles by the ZUC module and perform a logical conjunction operation of each bit of the sliding key string with bits of a message string to be hashed, to output a plurality of multi-bit strings. The first delay reduction system further comprises a plurality of first exclusive disjunction operators configured to perform a bit-wise logical exclusive disjunction operation on each of the plurality of multi-bit strings to output a plurality of single bits to reduce delay when computing a MAC using the ZUC module. The plurality of single bits together constitute a T-string used for computing the MAC.

In exemplary embodiments, the present disclosure relates to a second delay reduction system for reducing propagation delay in a hardware implementation of a complete non-linear function in a ZUC module. The second delay reduction system comprises a modular addition unit, in non-linear function part of the ZUC module. The modular addition unit comprises three split adders to perform modular addition of multi-bit string from an R1 register of the ZUC module and a string X1 extracted from a Linear Feedback Shift Register (LFSR) part of the ZUC module. The second delay reduction system further comprises a third exclusive disjunction operator configured to perform an exclusive disjunction operation on multi-bit string from an R2 register of the ZUC module and a string X2 extracted from the LFSR part, a half word interchange unit configured to interchange lower bits and upper bits of outputs of the modular addition unit and the third exclusive disjunction operator to provide a first new string, a second new string and a third new string, and two linear transformation units associated with the R2 register. The two linear transformation units are configured to receive the first new string and the second new string from the half word interchange unit and perform a linear transformation on the first new string and the second new string using a non-conventional three-level exclusive disjunction implementation. The second delay reduction system further comprises all-byte substitution boxes. Each of the all-byte substitution boxes is segmented into a plurality of smaller substitution boxes and is coupled with a corresponding linear transformation unit from the two linear transformation units. Each of the all-byte substitution boxes is configured to receive an output from the corresponding linear transformation unit and performing a substitution on the output to provide a substituted string to a multiplexer. The second delay reduction system further comprises the multiplexer configured to select an input to the R2 register of the ZUC module amongst the substituted strings received from the two substitution boxes, and provide the selected input to the R2 register, for reducing the delay in the non-linear function part.

In exemplary embodiments, the present disclosure relates to a method for reducing propagation delay in a hardware implementation of a complete non-linear function in a ZUC module, the method includes performing modular addition of a multi-bit string from R1 register of the ZUC module and the string X1 extracted from a Linear Feedback Shift Register (LFSR) part of the ZUC module, using a modular addition unit comprising three split adders in non-linear function part of the ZUC module. Further, the method includes performing an exclusive disjunction operation on multi-bit string from an R2 register of the ZUC module and the string X2 extracted from the LFSR part, using a third exclusive disjunction operator, interchanging lower bits and upper bits of outputs of the modular addition unit and the third exclusive disjunction operator, using a half word interchange unit, to provide a first new string, a second new string and a third new string, and performing a linear transformation, using two linear transformation units associated with the R2 register. The linear transformation is performed by receiving the first new string and the second new string from the half word interchange unit and performing a linear transformation on the first new string and the second new string using a non-conventional three-level exclusive disjunction implementation. The method further comprises performing a substitution using all-byte substitution boxes, each segmented to a plurality of smaller substitution boxes, wherein each of the all-byte substitution boxes are coupled with a corresponding linear transformation unit from the two linear transformation units. The substitution is performed by receiving an output from the corresponding linear transformation unit and performing a substitution on the output to provide substituted string to a multiplexer. The method further comprises multiplexing using the multiplexer by selecting an input to the R2 register of the ZUC module amongst substituted strings received from the two substitution boxes and providing the selected input to the R2 register, for reducing the delay in the non-linear function part.

The foregoing summary is illustrative only and is not intended to be in any way limiting. In addition to the illustrative aspects, exemplary embodiments, and features described above, further aspects, exemplary embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some exemplary embodiments of system and/or methods in accordance with exemplary embodiments of the present subject matter are now described, by way of example only, and regarding the accompanying figures, in which:

FIG. 4a shows exemplary representation of two byte-Substitution boxes implemented in ZUC module, in accordance with some exemplary embodiments of the present disclosure;

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific exemplary embodiments thereof have been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of exemplary embodiments of the disclosure, reference is made to the accompanying drawings that form a part hereof, and in which are shown by way of illustration specific exemplary embodiments in which the disclosure may be practiced. These exemplary embodiments are described in sufficient detail to enable those skilled in the art to practice the disclosure, and it is to be understood that other exemplary embodiments may be utilized and that changes may be made without departing from the scope of the present disclosure. The following description is, therefore, not to be taken in a limiting sense.

Present disclosure proposes methods and systems to reduce propagation delays in hardware implementation of 3GPP confidentiality or standardized algorithm 128-EEA3 and 3GPP integrity algorithm 128-EIA3 using ZUC module. The reduction of the propagation delays is achieved by improving or optimizing secondary critical paths, which are subsequent to primary critical path, related to the 3GPP confidentiality or standardized algorithm 128-EEA3 and the 3GPP integrity algorithm 128-EIA3. Non-conventional modifications in the hardware implementation are proposed for the improvement or optimization.

At hardware level implementation, the ZUC module comprises one or more components which include, but are not limited to, registers, flip flops, logical gates, operators, and so on. Further, the ZUC module is configured to generate a keystream for each clock cycle using the one or more components. The keystream may be a 32-bit string generated for an iteration after a clock cycle. Period of the clock cycle define speed of the implementation. Smaller the period, faster is the implementation. Further, the period of clock cycle depends on delay occurring during computation or performing mathematical operation in each of the one or more components. For example, delay associated with components in critical path of the ZUC module, define the clock cycle of the ZUC module. For example, if the delay in the critical path is 3 ns, then the period of the clock cycle cannot be below 3 ns. Further, the period of the clock cycle is inversely proportional to frequency of operation of the implementation. That is, for higher frequency of operation, lower period of the clock cycle is desired.

Keys generated by the ZUC module may be used for one or more use cases in the field of telecommunication. For example, for 5G related hardware implementations, one or more use cases may include, but is not limited to, 3GPP confidentiality or standardized algorithm 128-EEA3 and 3GPP integrity algorithm 128-EIA3. The 3GPP confidentiality or standardized algorithm 128-EEA3 is an encryption standard algorithm. The 3GPP confidentiality or standardized algorithm 128-EEA3 performs encryption and decryption of message string which is to be transmitted and received over a network. In exemplary embodiments, the 3GPP confidentiality or standardized algorithm 128-EEA3 may perform the encryption and the decryption using key generated by the ZUC module. The 3GPP integrity algorithm 128-EIA3 is used for computing MAC at receiver end and transmitter end. By comparing the MAC or hash computed using the 128-EIA3 hashing routine at both the receiver end and the transmitter end, a receiver may be able to check if a message string has been tampered. In exemplary embodiments, the 3GPP integrity algorithm 128-EIA3 may perform computation of MAC using the key generated by the ZUC module.

In each of the one or more-use cases, upon hardware implementation, one or more critical paths may be identified in the implementation. A path may be referred to be a critical path based on the components present in the path. Further, for a use case, the one or more critical paths may be classified to be primary critical path or secondary/subsequent critical paths based on delay associated with each of the one or more critical paths. In a conventional implementation of the ZUC module, primary critical path may be path from register R1 to S15. Upon the improvement or optimization of the primary critical path, there may be a need to optimize secondary or subsequent critical paths. The present disclosure teaches improving or optimizing the secondary critical paths. By proposed improvement or optimization, additional margin with respect to speed or performance of the implementation may be achieved. A secondary/subsequent critical path in the 3GPP confidentiality or standardized algorithm 128-EEA3 is R1 to R1 path as shown in FIG. 1. Similarly, a secondary critical path in the 3GPP integrity algorithm 128-EIA3 is R1 to T path as shown in FIG. 1.

Figure 2:
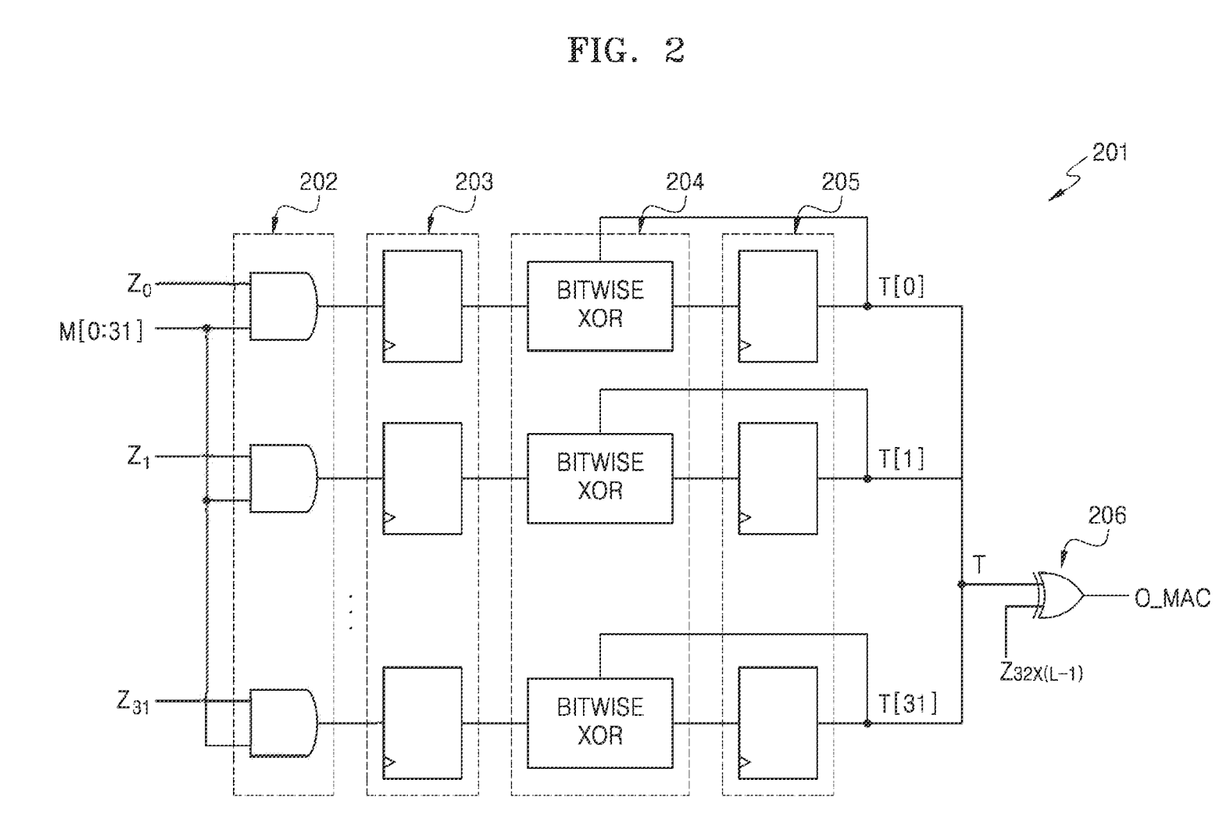
FIG. 2 shows first delay reduction system for reducing propagation delay in hardware implementation of 3GPP Integrity algorithm 128-EIA3 performed using ZUC module, in accordance with some exemplary embodiments of the present disclosure.

Consider the use of performing the 3GPP integrity algorithm 128-EIA3 using the ZUC module. The present disclosure proposes to improve or optimize the critical path R1 to T by modifying the hashing module integrated with the ZUC module. In exemplary embodiments, for improving or optimizing critical path R1 to T, the critical path R1 to R1 path needs to be improved or optimized using one or more techniques known to a person skilled in the art. FIG. 2 shows a first delay reduction system 201 which is modified hashing module proposed in the present disclosure. The first delay reduction system 201 is implemented along with the improved or optimized ZUC module for reducing propagation delay in the hardware implementation of the 3GPP Integrity algorithm 128-EIA3. The first delay reduction system 201 comprises plurality of conjunction operators 202, a plurality of multi-bit registers 203, a plurality of first exclusive disjunction operators 204, a plurality of single-bit registers 205 and a second exclusive disjunction operator 206. The plurality of conjunction operators 202 are configured to receive plurality of sliding key strings derived from keys generated in subsequent clock cycles by the ZUC module. At an instant of time, a single sliding key string Z [0:31] is used with a message string M [0:31] for performing computation of MAC. Each of the plurality of conjunction operators 202 is configured to receive corresponding bit of the single sliding key string Z [0:31] and 32 bits of the message string M [0:31]. Each of the plurality of conjunction operators 202 is configured to perform logical conjunction operation of each bit of the sliding key string with bits of the message string, which is to be hashed, to output plurality of multi-bit strings. The plurality of multi-bit registers 203 are configured to store corresponding multi-bit string from the plurality of multi-bit strings. Further, the plurality of first exclusive disjunction operators 204 are configured to perform bit-wise logical exclusive disjunction operation on each of the plurality of multi-bit strings to output plurality of single bits. The plurality of single-bit registers 205 are configured to store corresponding single bit from the plurality of single bits. The plurality of single bits together constitute T-string used for computation of MAC. Further, the second exclusive disjunction operator 206 is configured to perform an exclusive disjunction operation of the T-string with the sliding key string to generate Message Authentication Code (MAC) for the message string.

Using the first delay reduction system 201, as shown in FIG. 2, individual bits of the T string are computed using equations given below:

$$T[0]=T[0]\oplus(M[0]\&Z[0])\oplus(M[1]\&Z[1])\oplus \ldots \oplus(M[31]\&Z[31])$$

$$T[1]=T[1]\oplus(M[0]\&Z[1])\oplus(M[1]\&Z[2])\oplus \ldots \oplus(M[31]\&Z[32]) \ldots$$

$$T[31]=T[31]\oplus(M[0]\&Z[31])\oplus(M[1]\&Z[32])\oplus \ldots \oplus(M[31]\&Z[62])$$

T is computed bit as column-wise XOR of the message string and the sliding key string. T traverses 1 level of AND logic in one-cycle and in parallel traverses 32 XORs.

Using such computation, AND operations for current data and key inputs are performed in one cycle while XOR operation with results of previous AND operations happens in parallel in the same clock cycle.

Figure 3A:
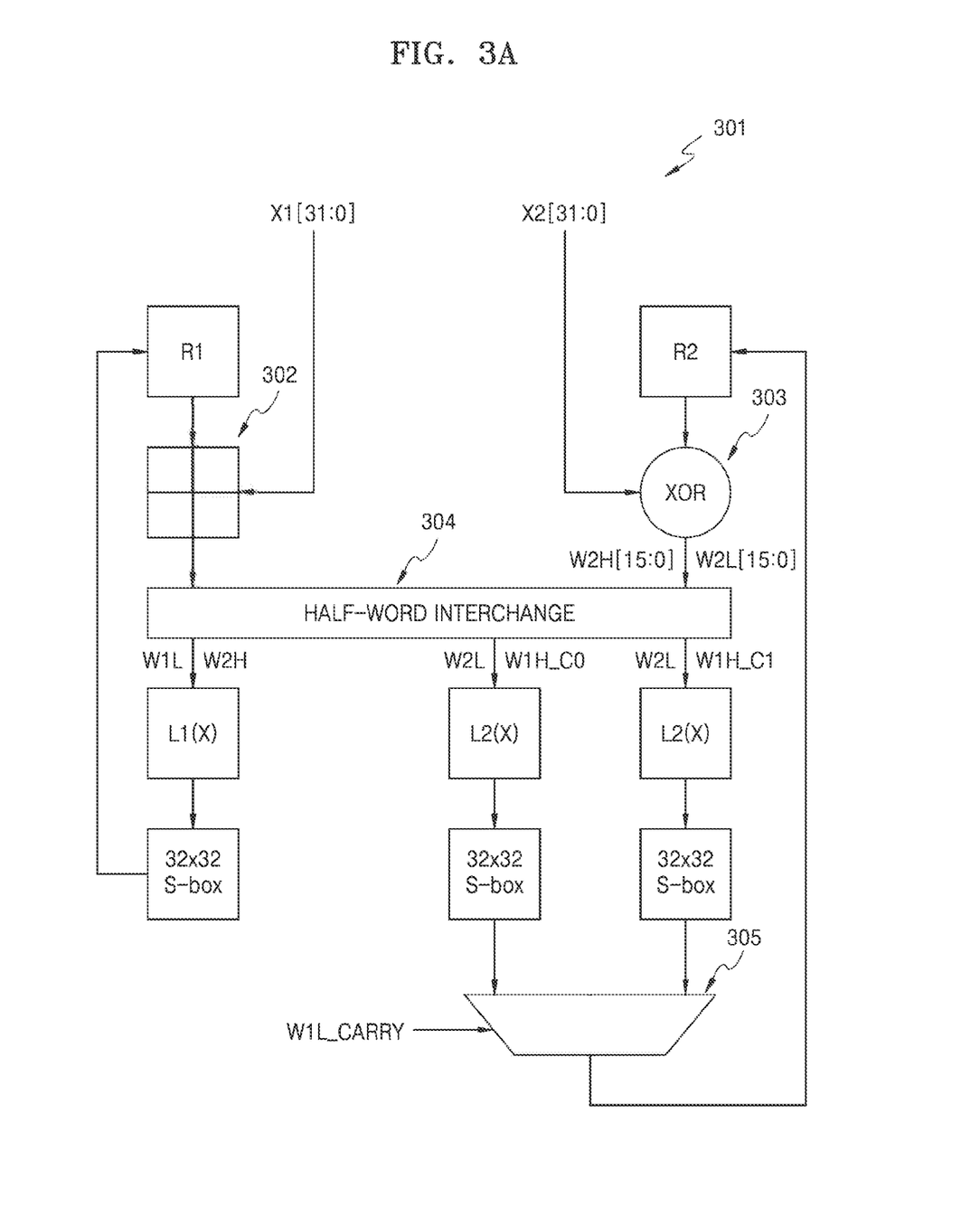
FIG. 3a shows second delay reduction system for reducing propagation delay in hardware implementation of complete non-linear function in ZUC module, in accordance with some exemplary embodiments of the present disclosure.

Consider the use-case of performing the 3GPP confidentiality or standardized algorithm 128-EEA3 using the ZUC module. The present disclosure proposes to improve or optimize the critical path R1 to R1 by modifying the ZUC module implemented in hardware. FIG. 3a shows a second delay reduction system 301 which is modified part of the ZUC module. The second delay reduction system is used for reducing propagation delay in hardware implementation of complete non-linear function in ZUC module. The second delay reduction system 301 comprises a modular addition unit 302, a third exclusive disjunction operator 303, a half word interchange unit 304, linear transformation units L1(X) and L2(X), all-byte substitution boxes (S-box) and/or a multiplexer 305.

Figure 3B:
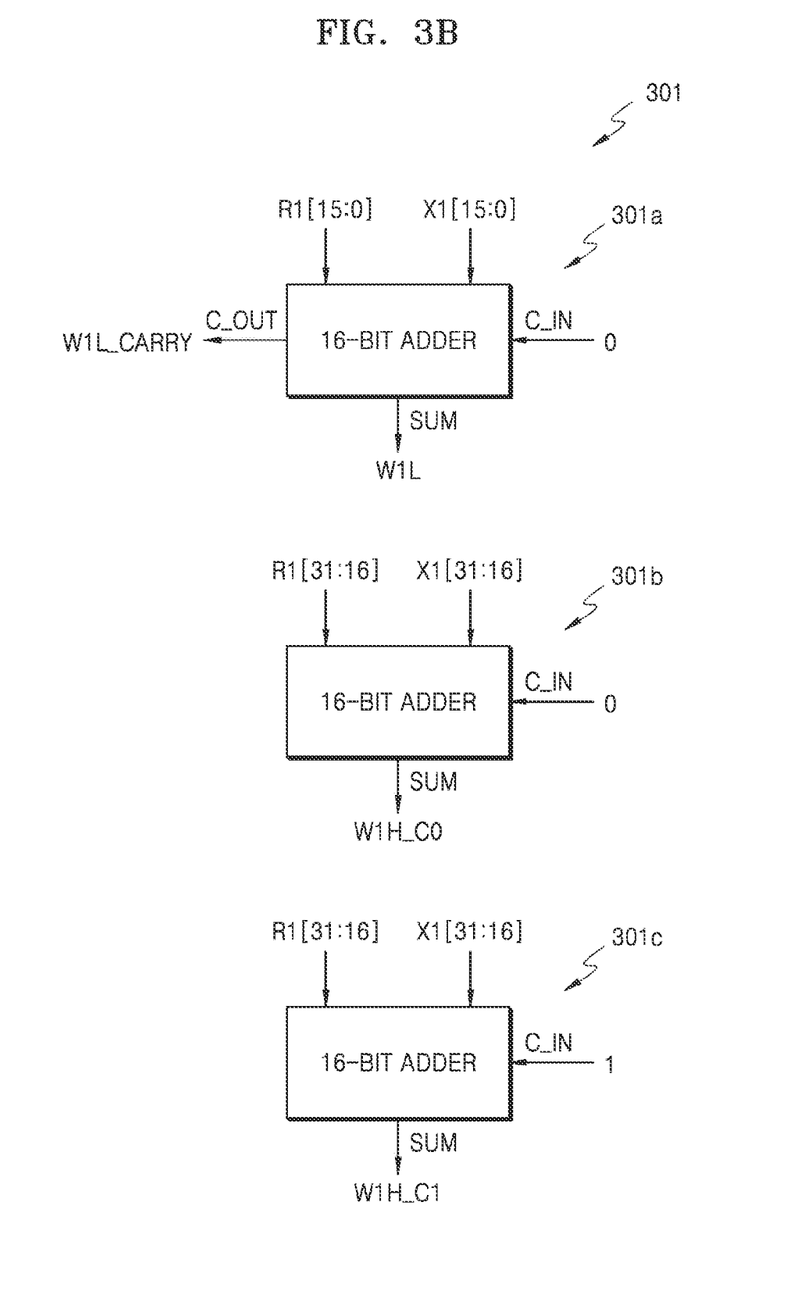
FIG. 3b shows a modular addition unit of second delay reduction system, in accordance with some exemplary embodiments of the present disclosure.

The modular addition unit 302 includes three split adders as shown in FIG. 3b. The modular addition unit 302 performs modular addition of multi-bit string from R1 register of the ZUC module and string X1 extracted from Linear Feedback Shift Register (LFSR) part of the ZUC module. The three split adders comprises a first adder 301a, a second adder 301b and a third adder 301c. The first adder 301a is configured to perform addition for lower bits of the multi-bit string R1[15:0] and lower bits of the string X1[15:0], with input carry value "0" to output a selection carry value (WIL_cary) and first lower bit string (WiL). The second adder 301b is configured to perform addition for upper bits of the multi-bit string R1[31:16] and upper bits of the string X1[31:16] with input carry value "0" to output first upper bit string (W1H_C0). The third adder 301c is configured to perform addition for the upper bits of the multi-bit string R1[31:16] and upper bits of the string X1[31:16] with input carry value "1" to output second upper bit string (W1H_C1). By using the three split adders, delay due to carry propagation is reduced through pre-computation.

The third exclusive disjunction operator 303 is configured to perform exclusive disjunction operation on multi-bit string from R2 register of the ZUC module and string X2 extracted from the LFSR part. The half word interchange unit 304 is configured to interchange lower bits and upper bits of outputs of the modular addition unit 302 and the third exclusive disjunction unit 303 to provide first new string, second new string and third new string. Each of the first new string, the second new string and the third new string are 32-bit strings. The first new string comprises lower bits of output W2L from the exclusive disjunction operator 303, and the first upper bit string W1H_C0, the second new string comprises lower bits of the output W2L from the exclusive disjunction operator 303 and the second upper bit string W1H_C1, and the third new string comprises the first lower bit string WIL and upper bits of the output W2H from the exclusive disjunction operator 303.

Two of the linear transformation units L2(X) are associated with the R2 register and linear transformation unit L1(X) is associated with the R1 register. The two linear transformation units L2(X) are configured to receive the first new string and the second new string from the half word interchange unit 304. Further, linear transformation on the first new string and the second new string is performed using non-conventional three-level exclusive disjunction implementation. The linear transformation unit L1(X), associated with the R1 register, is configured to receive the third new string from the half word interchange unit 304 and perform linear transformation on the third new string using the non-conventional three-level exclusive disjunction implementation. The non-conventional three-level exclusive disjunction implementation comprises reusing partial results in linear transform computation to reduce one-level of logical exclusive disjunction.

Spec defined linear transform function includes computation as shown below $$L_1(X) = X \oplus (X<<<_{32}2) \oplus (X<<<_{32}10) \oplus (X<<<_{32}18) \oplus (X<<<_{32}24)$$

$$L_2(X) = X \oplus (X<<<_{32}8) \oplus (X<<<_{32}14) \oplus (X<<<_{32}22) \oplus (X<<<_{32}30)$$

where $X<<<_{32} k$ is the k-bit cyclic shift of the 32-bit register X to the left Thus, both $L_1$ and $L_2$ are 4-level XOR functions.

Timing improved or optimized L1(X) implementation includes computation as shown below
Define $M = (X<<<_{32} 10) \oplus (X<<<_{32} 18)$
Let $L_1^{opt}(X) = (X<<<_{32} 2) \oplus M \oplus \{(M[17:0], M[31:18]\}$
It can be shown that $L_1^{opt}(X)$ is functionally equivalent to $L_1(X)$
Effectively, $L_1^{opt}(X)$ is a 3-level XOR implementation of $L_1(X)$.

Timing improved or optimized L1(X) implementation includes computation as shown below
Define $N = (X<<<_{32} 14) \oplus (X<<<_{32} 22)$
Let $L_2^{opt}(X) = (X<<<_{32} 30) \oplus N \oplus \{N[13:0], N[31:14]\}$
It can be shown that $L_2^{opt}(X)$ is functionally equivalent to $L_2(X)$
Effectively, $L_2^{opt}(X)$ is a 3-level XOR implementation of $L_2(X)$.

Thus, using the cyclic pattern present, partial results are re-used to reduce one-level logical exclusive disjunction.

Upon performing the linear transformations, the all-byte substitution boxes (S-box) associated with the two linear transformation units L2(X) receive output from the corresponding linear transformation unit and perform substitution on the output to provide substituted string to the multiplexer 305. The coupled all byte-Substitution box with the linear transformation unit L1(X) associated with the R1 register is configured to receive output from the linear transformation unit L1(X) and perform substitution on the output to provide substituted string to the R1 register.

Each of the all-byte substitution boxes (S-box) are segmented to plurality of smaller substitution boxes. In exemplary embodiments, each of the plurality of smaller substitution boxes are of a desired or predefined dimension. Further, for each of the plurality of smaller substitution boxes, a simplified Boolean expression is derived and realized using one or more logic gates, to perform the substitution.

Figure 4B:
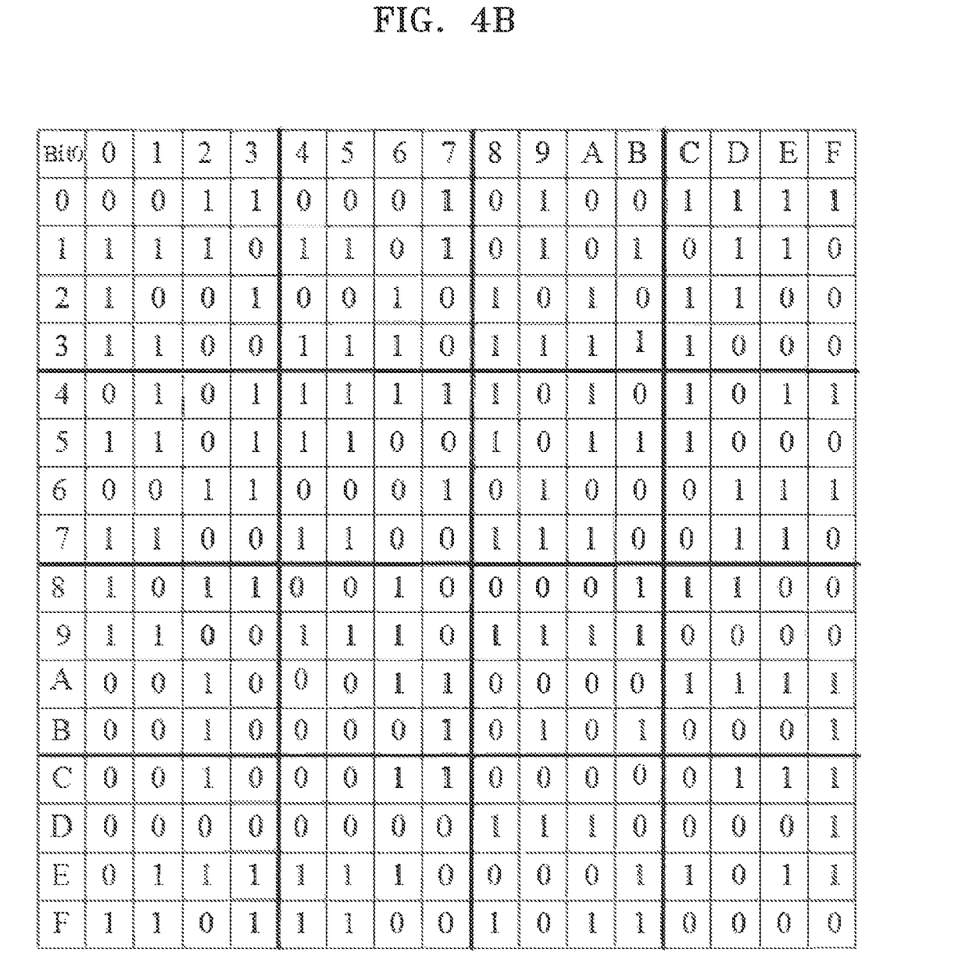
FIG. 4b shows segmentation of a byte-Substitution box to plurality of smaller substitution boxes, in accordance with some exemplary embodiments of the present disclosure.

In exemplary embodiments, all byte S-boxes (S0, S1, S2, S3) may be 32×32 S-box. S-box is juxtaposed 8×8 S-boxes e.g., S=(S0, S1, S2, S3), Where S0=S2 and S1=S3. Exemplary representation of S0 S-box 401 and S1 S-box 402 is shown in FIG. 4a. In exemplary embodiments, the 8×8 S-box may be split into smaller matrices with desired or predefined dimension. The desired or predefined dimension may be 4×4, 4×8, 8×8 and so on. Exemplary representation for S-box segmented to plurality of smaller substitution boxes is shown in FIG. 4b. For each 8-bit input to substitution box (represented in first row and first column), a simplified Boolean expressions for each output bit (rest of the rows and columns here) is obtained by splitting into smaller substitution boxes and selecting the correct output bit. With conventional implementation having 256:1 multiplexer, delay due to large select lines is involved. With the proposes S-box, the algebraic simplification is performed for each output bit and considerable reduction in combinatorial delay is achieved.

Further, the multiplexer is configured to select an input to the R2 register of the ZUC module amongst substituted strings received from the two substitution boxes and provide the selected input to the R2 register, for reducing the delay in the non-linear function part. The selection carry value from the first adder 301a is used as selection signal for the multiplexer to select the input to the R2 register.

Using the second delay reduction system 301, as shown in FIG. 3a, non-linear function improvement or optimization in the ZUC module may be achieved. Overall computations in the non-linear function is achieved using below computations.

```
F (X0, X1, X2) {
    W = (XO ⊕ R1) ⊞ R2;
    W2 = R2 ⊕ X2;
    {Wcarry, WIL] = RIL + XIL;
    R1 = S(L1(W1L||W2H));
    W1H_CO = RIH + XIH;
    W1H_C1 = R1H+X1H+1;
    R2_C0 = S (L2 (W2L||W1H_C0));
    R2_C1 = S (L2 (W2L||W1H_C1));
    R2 = Wcarry? R2_C1: R2_C0;
}
```

Further, L1, L2 representing linear transformation unit and S representing S-box is improved or optimized to achieve overall reduction in propagation delay.

Figure 5A:
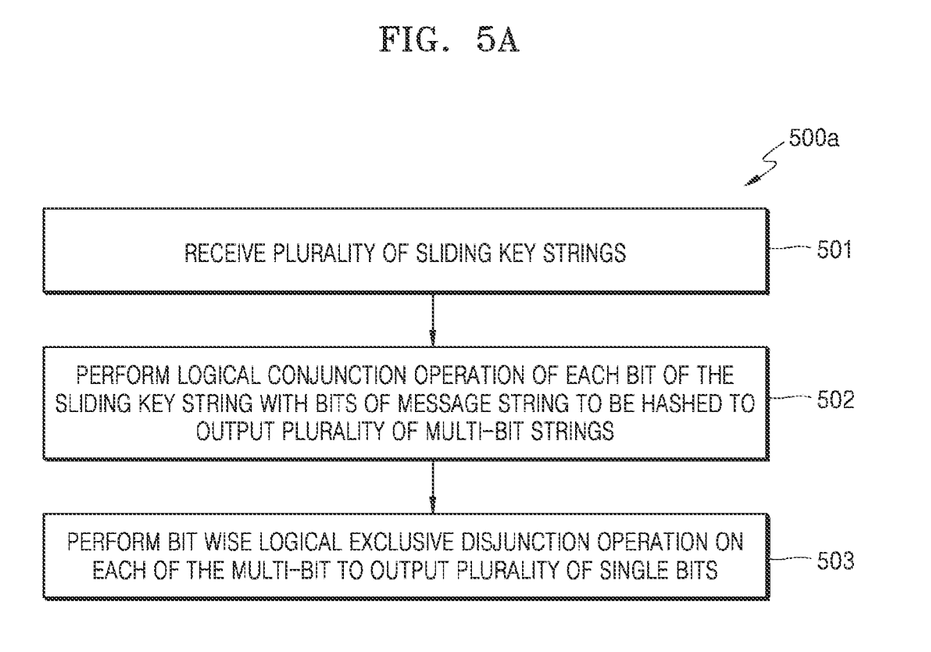
FIG. 5a shows a flow diagram illustrating method for reducing propagation delay in hardware implementation of 3GPP Integrity algorithm 128-EIA3 performed using ZUC module, in accordance with some exemplary embodiments of present disclosure.

FIG. 5a shows a flow diagram illustrating method for reducing propagation delay in hardware implementation of the 3GPP Integrity algorithm 128-EIA3 performed using ZUC module, in accordance with some exemplary embodiments of present disclosure.

At block 501, plurality of sliding key strings derived from keys generated in subsequent clock cycles by the ZUC module are received. In exemplary embodiments, number and size of each of the plurality of sliding key strings derived may be based on size of the message string. For example, if the message string is a 32-bit string, numbers of two keys may be generated by the ZUC module in two clock cycles. Further, using the two keys, thirty-two sliding key strings, each of 32 bits, may be derived by sliding through the two keys.

At block 502 using a conjunction operator, logical conjunction operation of each bit of the sliding key string with bits of the message string to be hashed is performed to output plurality of multi-bit strings.

At block 503, bit-wise logical exclusive disjunction operation is performed on each of the plurality of multi-bit strings using the exclusive disjunction operator, to output plurality of single bits. The plurality of single bits together constitute the T-string which is used to generate MAC for the message string.

Figure 5B:
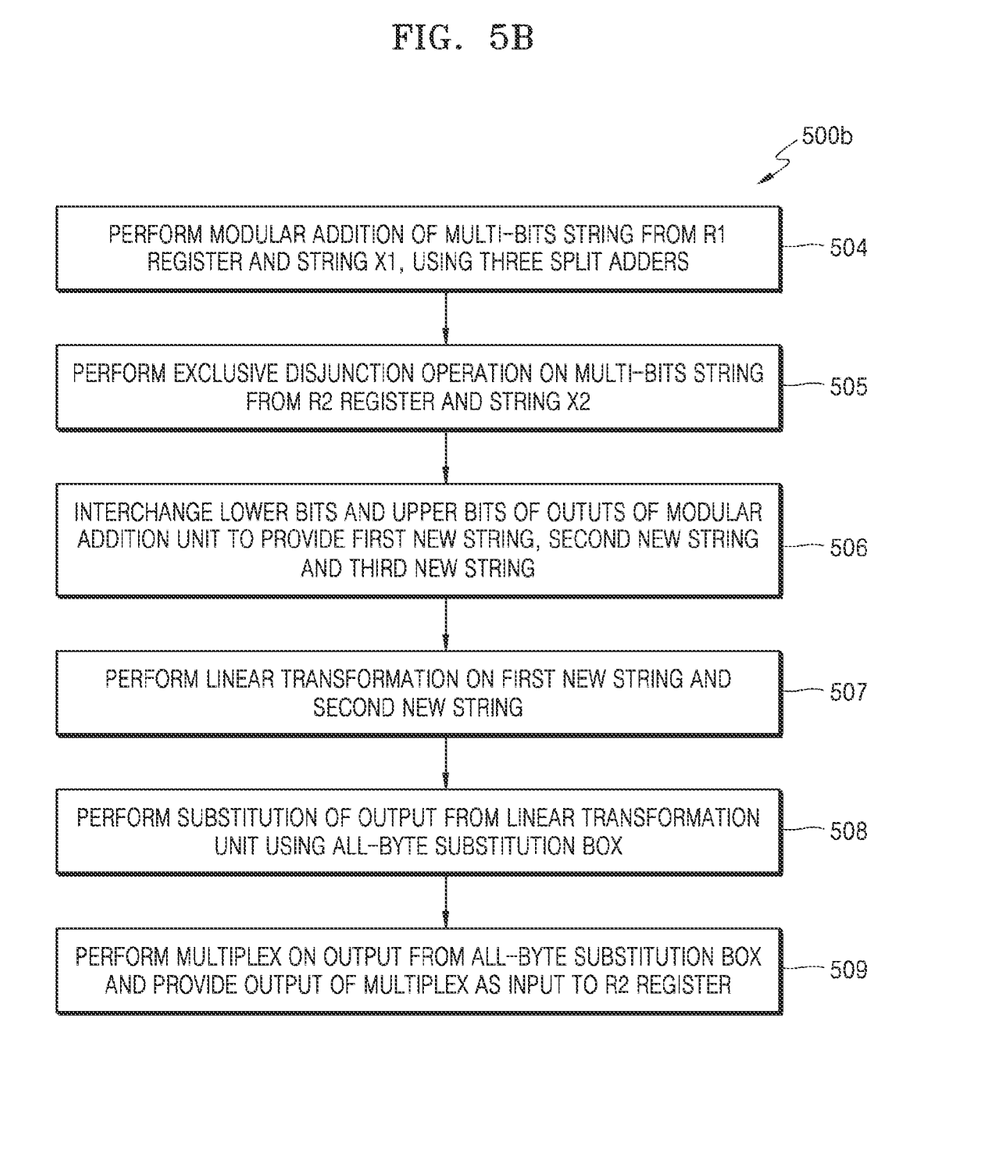
FIG. 5b shows a flow diagram illustrating an exemplary method for reducing propagation delay in hardware implementation of complete non-linear function in ZUC module, in accordance with some exemplary embodiments of present disclosure.

FIG. 5b shows a flow diagram illustrating an exemplary method for reducing propagation delay in hardware implementation of complete non-linear function in ZUC module, in accordance with some exemplary embodiments of present disclosure.

At block 504 modular addition of multi-bit string from the R1 register and the string X1 is performed using a modular addition unit. Conventional implementation of single 32-bit adder is replaced with the three split adders. By implementing the three split adders, pre-computation compensates for the carry propagation delay (occurring in the single 32-bit adder). Upper bits of output from the R1 register and the X1 strings is added using two adders assuming the input carry value to be "0" and "1". Further, the selection carry, obtained by adding the lower bits of output from the R1 register and the X1 strings is used as the select signal for the multiplexer to select the correct input for the R2 register update.

At block 505 exclusive disjunction operation is performed on multi-bit string from the R2 register of the ZUC module and the string X2 extracted from the LFSR part, using the third exclusive disjunction operator.

At block 506, lower bits and upper bits of outputs of the modular addition unit and the third exclusive disjunction unit are interchanged using the half word interchange unit to provide the first new string, the second new string and the third new string. The first new string comprises lower bits of output from the exclusive disjunction operator and the first upper bit string, the second new string comprises lower bits of the output from the exclusive disjunction operator and the second upper bit string, and the third new string comprises the first lower bit string and upper bits of the output from the exclusive disjunction operator.

At block 507 linear transformation is performed using two linear transformation units associated with the R2 register. The linear transformation is performed by receiving the first new string and the second new string from the half word interchange unit and performing linear transformation on the first new string and the second new string using the non-conventional three-level exclusive disjunction implementation. Conventional implementation included four-level logical exclusive disjunction. The proposed non-conventional implementation includes to reuse partial results in linear transform computation to reduce one-level of logical exclusive disjunction. By such one-level reduction, delay occurring due to operation of logical exclusive disjunction is reduced.

At block 508 substitution is performed using all-byte substitution boxes. Each of the all-byte substitution boxes is segmented to plurality of smaller substitution boxes. Each of the all-byte substitution boxes are coupled with corresponding linear transformation unit from the two linear transformation units to receive output from the corresponding linear transformation unit and perform substitution on the output to provide substituted string to the multiplexer. Each of the plurality of smaller substitution boxes are of the desired or predefined dimension. For each of the plurality of smaller substitution boxes, a simplified Boolean expression is derived and realized using one or more logic gates. A conventional implementation of the substitution box included 256:1 multiplexer. By replacing the 256:1 multiplexer, which is complex, with the one or more logic gates, a simpler circuitry with lesser computation time is realized.

At block 509 using the multiplexer, multiplexing is performed by selecting an input to the R2 register of the ZUC module amongst substituted strings received from the two substitution boxes and providing the selected input to the R2 register, for reducing the delay in the non-linear function part.

The order in which the methods illustrated in FIGS. 5a and 5b are described may not intended to be construed as a limitation, and any number of the described method blocks can be combined in any order to implement the method. Additionally, individual blocks may be deleted from the methods without departing from the scope of the subject matter described herein.

Furthermore, the method can be implemented in any suitable hardware, software, firmware, or combination thereof.

An "article of manufacture" includes non-transitory computer readable medium, and/or hardware logic, in which code may be implemented. A device in which the code implementing the described exemplary embodiments of operations is encoded may include a computer readable medium or hardware logic. Of course, those skilled in the art will recognize that many modifications may be made to this configuration without departing from the scope of the inventive concepts, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the inventive concepts" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of exemplary embodiments with several components in communication with each other does not imply that all such components are required. On the contrary a variety of optional components are described to illustrate the wide variety of possible exemplary embodiments of the inventive concepts.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other exemplary embodiments of the inventive concepts need not include the device itself.

The illustrated operations of FIGS. 5a and 5b show certain events occurring in a certain order. In alternative exemplary embodiments, certain operations may be performed in a different order, modified, or removed. Moreover, steps may be added to the above-described logic and still conform to the described exemplary embodiments. Further, operations described herein may occur sequentially or certain operations may be processed in parallel. Yet further, operations may be performed by a single processing unit or by distributed processing units.

One or more of the elements disclosed above may include or be implemented in one or more processing circuitries such as hardware including logic circuits; a hardware/software combination such as a processor executing software; or a combination thereof. For example, the processing circuitries more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Finally, the language used in the specification has been principally selected for readability and instructional purposes, and it may not have been selected to delineate or circumscribe the inventive subject matter. It is therefore intended that the scope of the inventive concepts be limited not by this detailed description, but rather by any claims that issue on an application based here on. Accordingly, the disclosure of exemplary embodiments of the inventive concepts is intended to be illustrative, but not limiting, of the scope of the inventive concepts, which is set forth in the following claims.

While various aspects and exemplary embodiments have been disclosed herein, other aspects and exemplary embodiments will be apparent to those skilled in the art. The various aspects and exemplary embodiments disclosed herein are for purposes of illustration and are not intended to be limiting, with the true scope and spirit being indicated by the following claims.

We claim:

1. A method to reduce propagation delay in a hardware implementation of a 3GPP Integrity algorithm 128-EIA3 performed using a ZUC module, the method comprising:
   receiving a plurality of sliding key strings derived from keys generated in subsequent clock cycles by the ZUC module;
   performing a logical conjunction operation of each bit of a sliding key string, of the plurality of sliding key strings, with bits of a message string to be hashed, using a conjunction operator, to output a plurality of multi-bit strings; and
   performing a bit-wise logical exclusive disjunction operation on each of the plurality of multi-bit strings using an exclusive disjunction operator, to output a plurality of single bits, for reducing delay in a computation of a Message Authentication Code (MAC) performed using the ZUC module, wherein the plurality of single bits together constitute a T-string used for the computation of the MAC.

2. The method as claimed in claim 1, further comprising:
   performing an exclusive disjunction operation of the T-string with the sliding key string, using a second exclusive disjunction operator, to generate the Message Authentication Code (MAC) for the message string.

3. The method as claimed in claim 1, further comprising, upon performing the logical conjunction operation:
   storing each of the plurality of multi-bit strings using a corresponding multi-bit register.

4. The method as claimed in claim 1, further comprising, upon performing the bit-wise logical exclusive disjunction operation:
   storing each of the plurality of single bits using a corresponding single- bit register.

5. The method as claimed in claim 1, wherein reducing the delay improves a secondary critical path associated with the computation of:
   MAC using the ZUC module.

6. A first delay reduction system for reducing propagation delay in a hardware implementation of a 3GPP Integrity algorithm 128-EIA3 performed using a ZUC module, the first delay reduction system comprises:
   a plurality of first processing circuitries configured to:
   receive a plurality of sliding key strings derived from keys generated in subsequent clock cycles by the ZUC module; and
   perform a logical conjunction operation of each bit of a sliding key string, of the plurality of sliding key strings, with bits of a message string to be hashed, to output a plurality of multi-bit strings; and
   a plurality of second processing circuitries configured to perform a bit-wise logical exclusive disjunction operation on each of the plurality of multi-bit strings to output a plurality of single bits to reduce delay in a computation of a Message Authentication Code (MAC) performed using the ZUC module, wherein the plurality of single bits together constitute a T-string used for the computation of the MAC.

7. The first delay reduction system as claimed in claim 6, further comprising:
   a third processing circuitry configured to perform an exclusive disjunction operation of the T-string with the sliding key string to generate the Message Authentication Code (MAC) for the message string.

8. The first delay reduction system as claimed in claim 6, further comprising:
   a plurality of multi-bit registers configured to store a corresponding multi-bit string from the plurality of multi-bit strings.

9. The first delay reduction system as claimed in claim 6, further comprising:
   a plurality of single-bit registers configured to store a corresponding single bit from the plurality of single bits.

10. The first delay reduction system as claimed in claim 6, wherein the first delay reduction system improves a secondary critical path associated with the computation of the MAC using the ZUC module.

11. A second delay reduction system for reducing propagation delay in a hardware implementation of a complete non-linear function in a ZUC module, the second delay reduction system comprises:
    a modular addition unit, in the non-linear function part of the ZUC module, comprising three split adders configured to perform modular addition of multi-bit string from an R1 register of the ZUC module and a string X1 extracted from a Linear Feedback Shift Register (LFSR) part of the ZUC module;
    a third processing circuitry configured to perform an exclusive disjunction operation on a multi-bit string from an R2 register of the ZUC module and a string X2 extracted from the LFSR part;
    first processing circuitry configured to interchange lower bits and upper bits of outputs of the modular addition unit and the third processing circuitry to provide a first new string, a second new string and a third new string;
    two second processing circuitries associated with the R2 register; the two second processing circuitries configured to:
    receive the first new string and the second new string from the first processing circuitry; and
    perform a linear transformation on the first new string and the second new string using a three-level exclusive disjunction implementation;
    all-byte substitution boxes, each segmented to a plurality of smaller substitution boxes, coupled with a corresponding second processing circuitry from the two second processing circuitries to:
    receive an output from the corresponding second processing circuitry; and perform a substitution on the output from the corresponding second processing circuitry to provide a substituted string to a multiplexer; and the multiplexer configured to:
  select an input to the R2 register of the ZUC module amongst substituted strings received from the all-byte substitution boxes and the plurality of smaller substitution boxes; and
  provide the selected input to the R2 register, for reducing the delay in the non-linear function part.

12. The second delay reduction system as claimed in claim 11 further comprising:
  a fourth processing circuitry associated with the R1 register, the fourth processing circuitry configured to:
    receive the third new string from the first processing circuitry; and
    perform a linear transformation on the third new string using the three-level exclusive disjunction implementation; and
  fifth processing circuitry including a substitution box segmented into a plurality of boxes with a predefined order and coupled with the fourth processing circuitry,
  wherein the substitution box is configured to:
    receive an output from the fourth processing circuitry; and
    perform a substitution on the output from the fourth processing circuitry to provide a substituted string to the R1 register.

13. The second delay reduction system as claimed in claim 11, wherein the three split adders comprises:
  a first adder configured to perform addition for lower bits of the multi-bit string and lower bits of the string X1, with an input carry value "0" to output a selection carry value and a first lower bit string;
  a second adder configured to perform addition for upper bits of the multi-bit string and upper bits of the string X1, with an input carry value "0" to output a first upper bit string; and
  a third adder configured to perform addition for the upper bits of the multi-bit string and the upper bits of the string X1, with an input carry value "1" to output a second upper bit string.

14. The second delay reduction system as claimed in claim 13, wherein the selection carry value is used as selection signal for the multiplexer to select the input to the R2 register.

15. The second delay reduction system as claimed in claim 13, wherein the first new string comprises lower bits of an output from the third processing circuitry and the first upper bit string, the second new string comprises lower bits of the output from the third processing circuitry and the second upper bit string, and the third new string comprises the first lower bit string and upper bits of the output from the third processing circuitry.

16. The second delay reduction system as claimed in claim 11, wherein each of the plurality of smaller substitution boxes are of a predefined dimension.

17. The second delay reduction system as claimed in claim 11, wherein, for each of the plurality of smaller substitution boxes, a simplified Boolean expression is derived and realized using one or more logic gates.

18. The second delay reduction system as claimed in claim 11, wherein the three-level exclusive disjunction implementation is configured to reuse partial results of a linear transform computation to reduce one-level of logical exclusive disjunction.

\* \* \* \* \*